No. 656,512. Patented Aug. 21, 1900.
S. O. CAMPBELL.
GATE.
(Application filed June 6, 1900.)
(No Model.) 2 Sheets—Sheet 1.
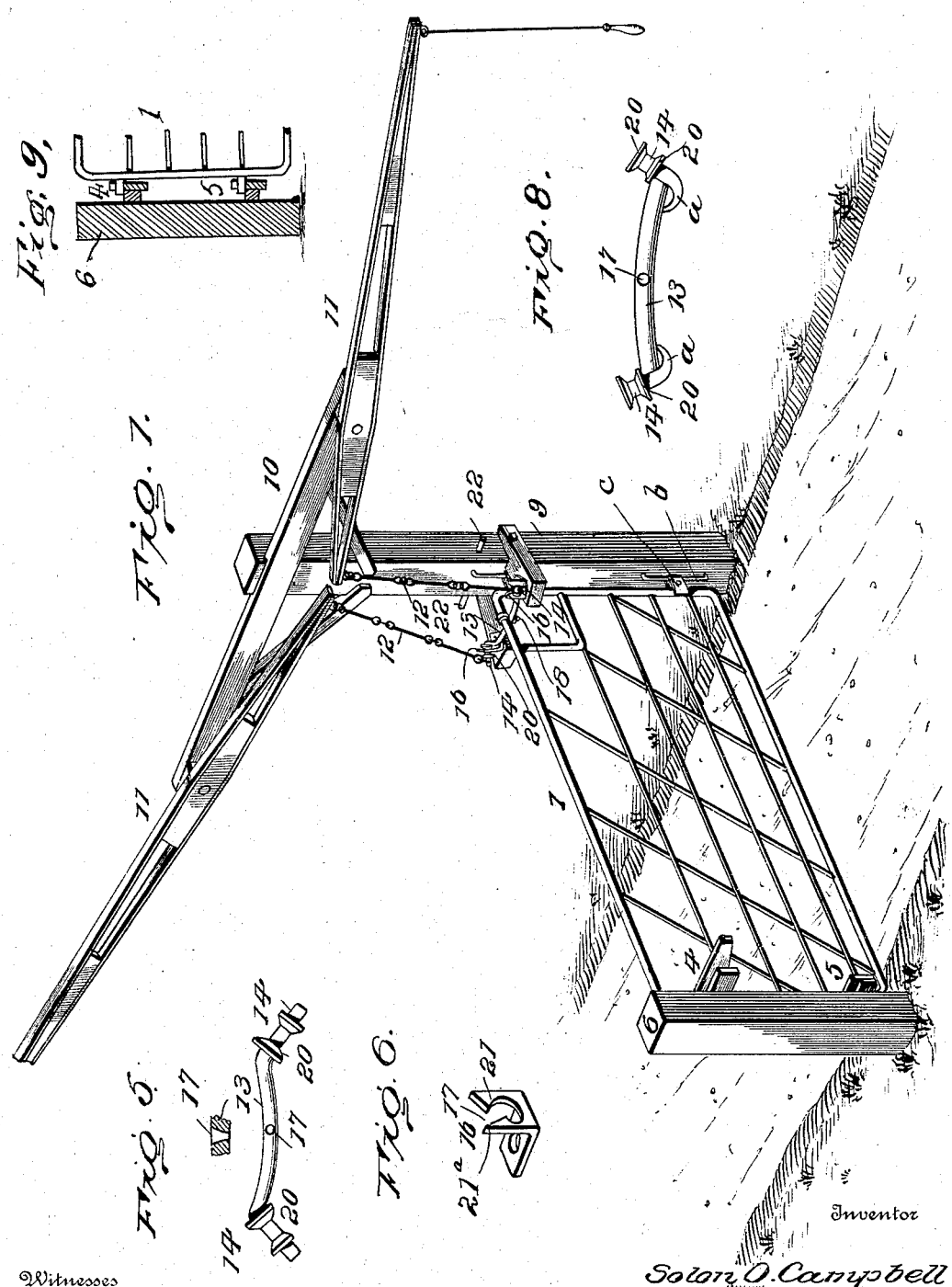
Witnesses
Inventor
Solon O. Campbell
By Lacey Attorneys No. 656,512. Patented Aug. 21, 1900.
S. O. CAMPBELL.
GATE.
(Application filed June 6, 1900.)
(No Model.) 2 Sheets—Sheet 2.
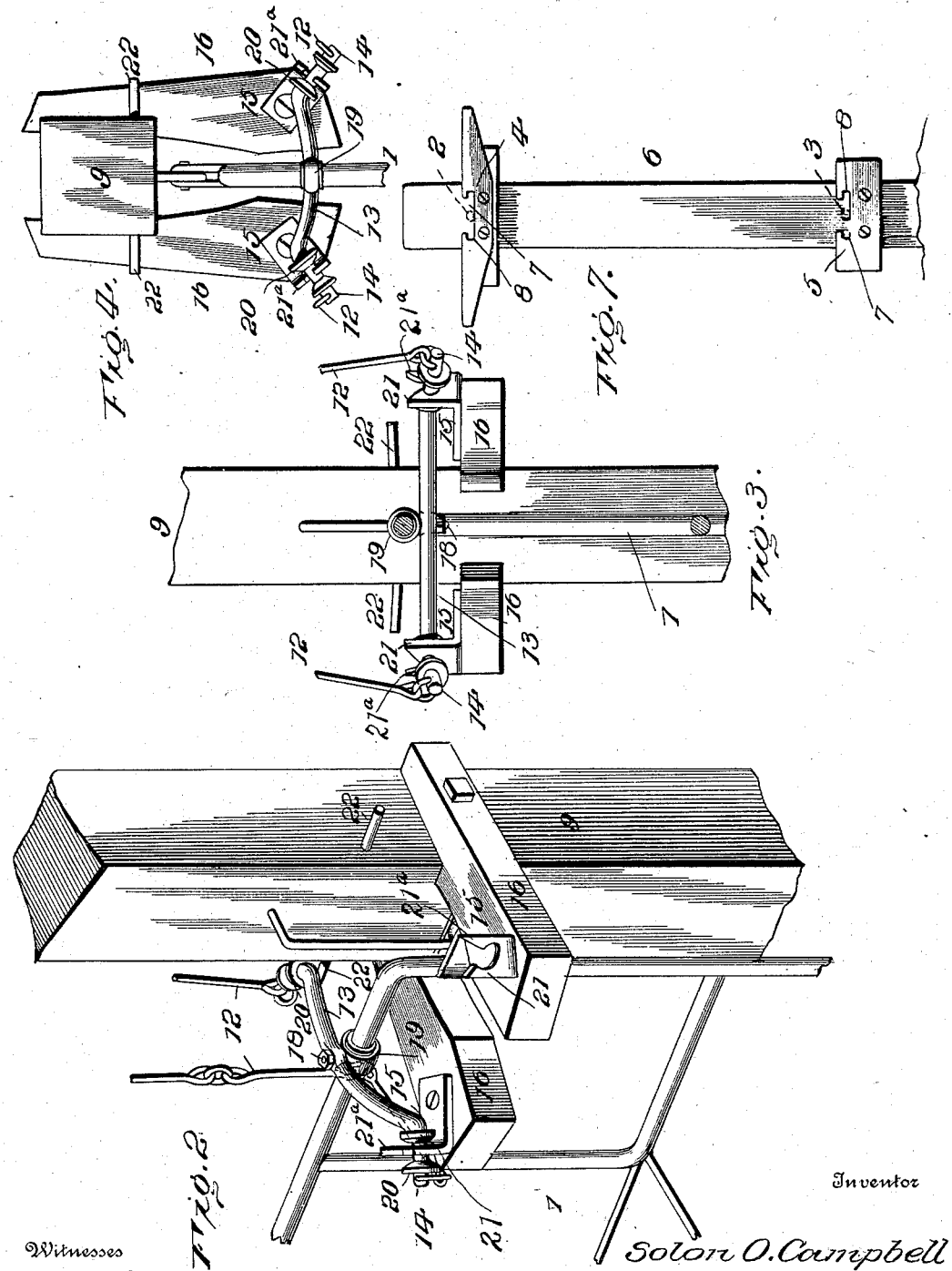
Witnesses
Inventor
Solon O. Campbell
By R.S.&A.B.Lacey his Attorneys

UNITED STATES PATENT OFFICE.

SOLON O. CAMPBELL, OF EAST PERU, IOWA.

GATE.

SPECIFICATION forming part of Letters Patent No. 656,512, dated August 21, 1900.

Application filed June 6, 1900. Serial No. 19,278. (No model.)

*To all whom it may concern:*

Be it known that I, SOLON O. CAMPBELL, a citizen of the United States, residing at East Peru, in the county of Madison and State of Iowa, have invented certain new and useful Improvements in Gates; and I do hereby declare the following to be a full, clear, and exact description of the invention, such as will enable others skilled in the art to which it appertains to make and use the same.

This invention belongs to the class of gates of which that set forth in Letters Patent of the United States No. 642,205, granted to me January 17, 1900, is typical, the purpose being to greatly simplify the gate-operating mechanism and to provide a construction which is certain in operation and not liable to derangement and which is durable and easy to manipulate.
The improvement consists, essentially, of the novel features, details of construction, and combination of parts, which hereinafter will be more fully described, illustrated, and finally claimed.
Referring to the drawings and the figures thereof, in which and the description corresponding like parts are indicated by the same reference characters, Figure 1 is a perspective view of a gate embodying the invention. Fig. 2 is a detail view in perspective of the swing-beam and parts intimately associated therewith, showing their disposition when the gate is swung open. Fig. 3 is a front view of the parts indicated in Fig. 2, showing their relation when the gate is closed. Fig. 4 is a top plan view of the same elements. Fig. 5 is a detail perspective view of the swing-beam. Fig. 6 is a detail perspective view of one of the bracket-guides. Fig. 7 is a front view of the upper and lower catch-plates or keepers which coöperate with projections of the gate to hold the latter closed. Fig. 8 is a detail view of a modified form of swing-beam. Fig. 9 is a detail view of the swing end portion of the gate and the latch-post, the catch-plates being in section to show more clearly the projections of the gate coöperating therewith.

The gate 1 is shown as of panel form, although it may be of any pattern, and is mounted so as to swing open from either side, the hinges being so formed as to permit the gate to be raised bodily and to be at the same time elevated more rapidly at its swinging end, whereby it is enabled to clear weeds, snow, and the like and to close automatically after an initial impetus has been imparted thereto. Inasmuch as the gate is mounted in substantially the same manner as disclosed in my prior patent and may be mounted in any well-known manner, so as to attain the objects aforesaid, and since said mountings form no essential part of the present invention, they will not be referred to in detail. Projections 2 and 3 extend from the swing end of the gate and are adapted to coöperate with corresponding catch-plates 4 and 5, secured to the latch-post 6, arranged at one side of the roadway controlled by the gate. The upper catch-plate 4 is larger than the lower catch-plate whereby the upper projection is adapted to engage with either end thereof when closing the gate and insure both projections entering the notches 7 in the top edge of the said plates 4 and 5. The end walls of the notches 7 are undercut, as shown at 8, to receive the projections 2 and 3 and prevent the gate swinging too far when closing rapidly and tending to rebound when the projections 2 and 3 strike the end walls of the said notches. The notches or cut-away portions 7 are about an inch to two inches in length, whereas the projections 2 and 3, coöperating therewith, are approximately three-fourths of an inch in width. Hence it will be seen that the projections have considerable play in the notches, and this is essential in order to enable said projections to clear the notches when swinging the gate open from either side.

The hinge-post 9 is located at the opposite side of the roadway to the latch-post and is provided at its upper end with a cross-arm 10, to which operating-levers 11 are fulcrumed intermediate of their ends, the inner terminals of said operating-levers being connected by chains 12 or like means with the extremities of the swing-beam 13. The operating-levers extend about parallel with the roadway and at one side thereof, and their outer ends are adapted to be drawn downward when it is required either to open or close the gate, this operation being accomplished in the ordinary manner. The swing-beam 13 consists, preferably, of a single bar longitudinally curved and having divergent terminals 14, which are adapted to coöperate with bracket-guides 15, secured to the outer ends of arms 16, made fast to opposite sides of the hinge-post 9 and projecting therefrom toward the roadway upon slightly-divergent lines. The swing-beam is provided centrally with a vertical opening 17, which is flared slightly at its upper end in the direction of the length of the swing-beam, so as to allow for a limited play of the eyebolt 18, having loose connection with a bar or portion of the gate. A peripherally-grooved collar 19 is secured to a bar of the gate and receives the eye portion of the eyebolt 18, so as to prevent displacement of these parts after they have been properly assembled. The extremities of the terminal portions 14 are apertured to receive the lower ends of the flexible connections or chains 12, and collars 20, spaced apart, are secured to the parts 14, and their inner sides are outwardly divergent and are adapted to receive the hooked extensions 21 of the bracket-guides 15. By having the collars 20 flared upon their inner sides the terminal portions of the swing-beam are properly guided to place when swinging the gate shut after being opened.

The bracket-guides may be of any construction, and, as shown, are of right-angular form, their horizontal portions being secured to the arms 16 and their vertical members terminating in the spaced hooked extensions 21 and 21$^a$, the hooked portions facing and having their upper portions oppositely beveled to facilitate the entrance of the terminals 14 between them when the gate is closing. The extensions 21 are larger than the extensions 21$^a$ and the hooks thereof are located in a higher plane, this construction being necessary in order to secure the best results in the working of the swing-beam 13. The edges of the extensions 21 and 21$^a$ curve in opposite directions at points below the hooks, so as to insure the engagement of one or the other of the terminals 14 with the outermost hooked extension when swinging the gate open. The parts are so constructed and proportioned that when a direct pull is exerted upon either of the chains 12 the terminal 14, connected with said chain, will leave the bracket-guide and cause the gate to rise and swing open. The opposite terminal 14 will ride in the inclined space of the opposite bracket-guide and engage with the outermost hooked extension and constitute a fulcrum for the swing-beam to turn upon. When the gate has swung open to the required extent, one of a pair of stops 22, projecting from opposite sides of the hinge-post, will engage with the swing end of the beam 13 and limit its movement and the opening of the gate, as shown most clearly in Fig. 2. The gate when open may be closed by operating either lever 11. When actuating the lever previously operated to open the gate, the pull will be direct upon the swing end of the beam 13, and upon operating the other lever the pull will be direct upon the gate, since a part of its chain or flexible connection 12 now extends horizontally under the upper rail of the gate. This is shown to best advantage in Fig. 2. When opening and closing the gate, the latter first rises for about one-half of its movement and then sinks or falls during the remainder of its movement. The first part of the movement of the gate is direct and the latter part is the result either of the initial impetus imparted to the gate or the gravitative action thereof due to its falling after it has passed the dead-point.

In Fig. 8 is shown a form of swing-beam in which the power is applied more in direct line, eyes $a$ being provided adjacent to the beam to receive the connections 12. The lower hinge member or staple $b$ is located, with reference to the member $c$ and the rise of the gate, to limit the upward movement of the latter when the gate is swung open, thereby preventing the fulcrum end of the swing-beam from leaving its seat.

Having thus described the invention, what is claimed as new is—

1. In combination with a swinging gate and a swing-beam fitted thereto and having offstanding terminal portions, bracket-guides located upon opposite sides of the plane of the gate and comprising spaced hooked extensions to coöperate with the terminal portions of the said beam, and actuating means for operating the swing-beam to effect an opening and a closing of the gate, substantially as set forth.

2. In combination with a swinging gate, a swing-beam having offstanding terminal portions and fitted to said gate, and actuating mechanism for the swing-beam to effect an opening and a closing of the gate, bracket-guides located at opposite sides of the plane of the gate, each having spaced hooked extensions of different lengths the upper ends of which are made divergent, substantially as specified.

3. In combination with a swinging gate, a swing-beam fitted thereto and actuating mechanism therefor, bracket-guides located at opposite sides of the plane of the gate, each provided with spaced hooked extensions to coöperate with the swing-beam, and which have their upper portions upwardly and oppositely inclined, as and for the purpose set forth.

4. In combination with a swinging gate, a swing-beam fitted thereto and having offstanding terminal portions, spaced collars fitted to the said terminal portions and having their inner sides outwardly flaring, bracket-guides located at opposite sides of the plane of the gate, each provided with spaced hooked extensions to coöperate with the terminal portions of the said swing-beam, and actuating mechanism for the swing-beam to effect an opening and a closing of the gate, substantially as specified.

5. In combination with a swinging gate, a longitudinally-curved swing-beam having divergent terminal portions and fitted centrally to a portion of the gate, bracket-guides located at opposite sides of the plane of the gate, each provided with spaced hooked extensions to coöperate with the terminal portions of the swing-beam, and actuating mechanism for operating the swing-beam, substantially as set forth.

In testimony whereof I affix my signature in presence of two witnesses.

SOLON O. CAMPBELL.

Witnesses:
 W. H. BARBARY,
 B. L. THRIFT.